US011975774B2

United States Patent
Kinoshita et al.

(10) Patent No.: US 11,975,774 B2
(45) Date of Patent: May 7, 2024

(54) DRIVING ASSISTANCE DEVICE

(71) Applicant: Daimler Truck AG, Leinfelden-Echterdingen (DE)

(72) Inventors: Masaaki Kinoshita, Kawasaki (JP); ShangLin Yu, Kawasaki (JP)

(73) Assignee: Daimler Truck AG, Leinfelden-Echterdingen (DE)

(*) Notice: Subject to any disclaimer, the term of this patent is extended or adjusted under 35 U.S.C. 154(b) by 0 days.

(21) Appl. No.: 18/262,329

(22) PCT Filed: Jan. 18, 2022

(86) PCT No.: PCT/JP2022/001672
§ 371 (c)(1),
(2) Date: Jul. 20, 2023

(87) PCT Pub. No.: WO2022/158459
PCT Pub. Date: Jul. 28, 2022

(65) Prior Publication Data
US 2024/0034398 A1 Feb. 1, 2024

(30) Foreign Application Priority Data
Jan. 21, 2021 (JP) .................. 2021-007741

(51) Int. Cl.
*B62D 6/00* (2006.01)
(52) U.S. Cl.
CPC .................. *B62D 6/001* (2013.01)
(58) Field of Classification Search
CPC .................. B62D 6/001
See application file for complete search history.

(56) References Cited

U.S. PATENT DOCUMENTS

| 2016/0288830 A1 | 10/2016 | Hori et al. |
| 2019/0031194 A1 | 1/2019 | Kim et al. |
| 2022/0161785 A1 | 5/2022 | Tashiro et al. |

FOREIGN PATENT DOCUMENTS

| CN | 105716617 A | 6/2016 |
| CN | 110667563 A | 1/2020 |

(Continued)

OTHER PUBLICATIONS

International Preliminary Report (PCT/IB/373) and Written Opinion (PCT/ISA/237) issued in PCT Application No. PCT/JP2022/001672 dated Jul. 20, 2023 (4 pages)—English translation of previously cited C2.

(Continued)

*Primary Examiner* — Mathew Franklin Gordon
(74) *Attorney, Agent, or Firm* — Crowell & Moring LLP

(57) ABSTRACT

A driving assistance device that executes automatic steering such that, when a vehicle is reversing, the vehicle tracks back along a trace formed in forward traveling. The device includes: a trace estimator that estimates the trace based on a vehicle speed and a steering angle in forward traveling of the vehicle; a target steering angle calculator that calculates a target steering angle based on a positional relationship between a reference point and a target point, the reference point corresponding to a current position of the vehicle, the target point being positioned on the trace and having a predetermined value of distance from the reference point; an automatic steering unit that automatically operates a steering; and a vehicle speed calculator that calculates the vehicle speed based on a rotating speed of a steerable wheel.

5 Claims, 4 Drawing Sheets

(56) References Cited

FOREIGN PATENT DOCUMENTS

| | | |
|---|---|---|
| CN | 111601744 A | 8/2020 |
| DE | 10 2015 220 380 A1 | 10/2016 |
| JP | 2007-237930 A | 9/2007 |
| JP | 2008-56173 A | 3/2008 |
| JP | 2016-193678 A | 11/2016 |
| JP | 2018-34540 A | 3/2018 |
| JP | 2020-131972 A | 8/2020 |
| JP | 2020-147220 A | 9/2020 |
| KR | 10-2015-0077823 A | 7/2015 |
| KR | 10-2019-0011852 A | 2/2019 |
| KR | 10-2020-0071713 A | 6/2020 |
| WO | WO 2020/189061 A1 | 9/2020 |

OTHER PUBLICATIONS

PCT/JP2022/001672, International Search Report dated Mar. 15, 2022 (Two (2) pages).

PCT/JP2022/001672, Japanese-language of Written Opinion (PCT/ISA/237) dated Mar. 15, 2022 (Three (3) pages).

Chinese-language Chinese Office Action issued in Chinese Application No. 202280010933.1 dated Feb. 27, 2024, with partial English translation (12 pages).

FIG.3
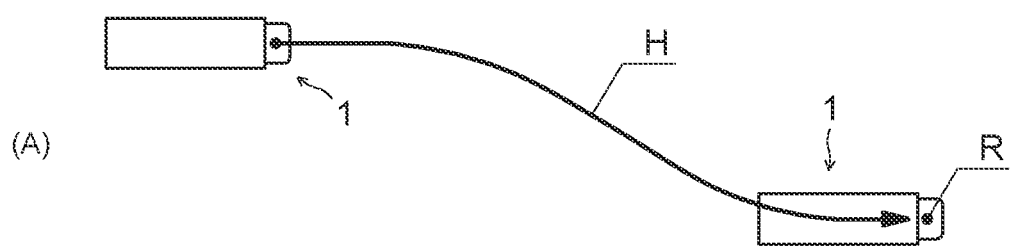
(A)
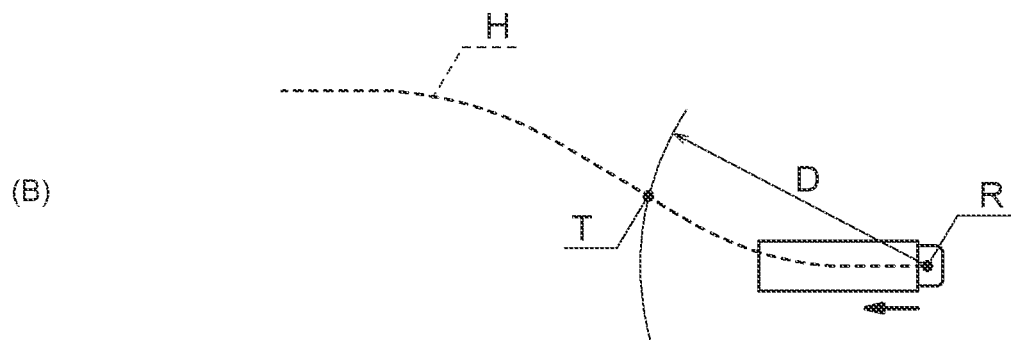
(B)

DRIVING ASSISTANCE DEVICE

TECHNICAL FIELD

The present invention relates to a driving assistance device that executes automatic steering such that, when a vehicle is reversing, the vehicle tracks back along a trace formed in forward traveling.

BACKGROUND ART

Conventionally, driving assistance devices have been developed, which assist driving by providing information about conditions of surroundings to occupants when a vehicle is reversing (traveling backward) and by intervening in operations as necessary. For example, a proposed device records a traveling trace in forward traveling of a vehicle by using images captured by an on-board camera and/or position information of a GPS (Global Positioning System), and executes a control that causes the vehicle to move backward in the same manner as the traveling trace. Such a control makes reversing easier in, for example, narrow mountain roads, narrow general roads, intricate parking lots, and the likes, and contributes to a reduction in the burden of drivers (see Patent Literature 1).

CITATION LIST

Patent Literature

[PATENT LITERATURE 1] Japanese Laid-Open Patent Publication No. 2007-237930

SUMMARY OF INVENTION

Technical Problem

In the recording of the traveling traces, the position of an own vehicle can be specified with reference to positions of objects, buildings, and the likes included in the images captured by the on-board camera. On the other hand, in a commercial vehicle such as a truck or a bus that has a long vehicle length, it is difficult to grasp conditions of overall surroundings by an on-board camera, and thus, it is difficult to accurately determine the position of the own vehicle. In addition, in order to accurately measure the position of the own vehicle using the GPS, a large and expensive GPS sensor or module is required, which leads to an increase in the cost and also to a complication of the device configuration.

The present invention has been made in view of the above problems, and an object of the present invention is to provide a driving assistance device capable of enhancing accuracy of automatic steering with a simple configuration.

Solution to Problem

The present invention has been made to solve at least part of the above problems, and can be realized as the following aspects or application examples.

(1) The driving assistance device of the present application example executes automatic steering such that, when a vehicle is reversing, the vehicle tracks back along a trace formed in forward traveling. The driving assistance device includes: a trace estimator that estimates the trace based on a vehicle speed and a steering angle in forward traveling of the vehicle; a target steering angle calculator that calculates, upon receipt of an instruction on the automatic steering, a target steering angle based on a positional relationship between a reference point and a target point, the reference point corresponding to a current position of the vehicle estimated from the vehicle speed and the steering angle, the target point being positioned on the trace and having a predetermined value of distance from the reference point; and an automatic steering unit that automatically operates a steering such that a steering angle in reversing of the vehicle becomes the target steering angle. The driving assistance device further includes a vehicle speed calculator that calculates the vehicle speed based on a rotating speed of a steerable wheel.

According to the driving assistance device described above, the steerable wheel, i.e., a steering operation causes the direction of the wheel to change, and information on the vehicle speed, which is calculated from the rotating speed of the wheel that changes the traveling direction of the vehicle, is used. That is, one of the characteristics is to calculate the vehicle speed based on the rotating speed of the wheel operated by the steering. Based on the information on this vehicle speed and the steering angle, the trace estimator estimates the trace, so that the trace of the vehicle is accurately specified. Further, based on the information on this vehicle speed and the steering angle, the position of the reference point corresponding to the position of the vehicle is estimated, and the target steering angle calculator calculates the target steering angle, so that the steering angle for following the trace in reversing of the vehicle is optimized. Consequently, accurate tracking along the trace is enabled, and the accuracy of the automatic steering is enhanced with a simple configuration.

Especially, since the wheelbase is long in a commercial vehicle such as a truck, by calculating the vehicle speed based on the steerable wheel (usually a front wheel(s)) operated by the steering, and by obtaining the trace based on this vehicle speed and the steering angle, a more accurate trace of the vehicle is specified. In addition, when the vehicle is reversing, based on this vehicle speed and the steering angle, the vehicle position, i.e., the position of the reference point is accurately estimated. This results in more accurate calculation of the target steering angle for tracking along the trace, and thus, correct tracking along the trace is enabled.

(2) In the above (1), the target steering angle calculator may change the predetermined value in accordance with the vehicle speed calculated by the vehicle speed calculator when the vehicle is reversing.

Changing the predetermined value in accordance with the vehicle speed enables the vehicle to more accurately move backward along the trace, and thus, the accuracy of the automatic steering is enhanced with a simple configuration.

(3) In the above (2), the target steering angle calculator may change the predetermined value to be larger as the vehicle speed calculated by the vehicle speed calculator is higher when the vehicle is reversing, and may change the predetermined value to be smaller as the vehicle speed is lower.

When the vehicle is quickly moved backward, the target point is set farther away, and conversely, when the vehicle is slowly moved backward, the target point is set closer to the vehicle, which yields enhanced accuracy in following the trace by the automatic steering.

(4) In any one of the above (1) to (3), the vehicle speed may be calculated based on an average value of rotating speeds of all steerable wheels.

By calculating the vehicle speed based on the average value of the rotating speeds of all the steerable wheels, the accuracy in estimating the motion of the vehicle and/or the trace is enhanced, and the accuracy of the automatic steering is enhanced with a simple configuration.

(5) In any one of the above (1) to (4), the reference point may be regarded as a central position of all steerable wheels in a top view of the vehicle, and the trace may be estimated as a path along which the reference point has moved.

By regarding the central position of all the steerable wheels in a top view as the reference point, the accuracy in estimating the actual motion of the vehicle and/or the trace is enhanced, and the accuracy of the automatic steering is enhanced with a simple configuration.

Advantageous Effects of Invention

By the driving assistance device according to the present application example, the accuracy of the automatic steering can be enhanced with a simple configuration that uses only existing sensors.

BRIEF DESCRIPTION OF DRAWINGS

FIG. 3 (A) is a schematic diagram illustrating a trace estimated in forward traveling, and (B) is a schematic diagram illustrating a target point set in reversing.

DESCRIPTION OF EMBODIMENT(S)

[1. Device Configuration]

Figure 1:
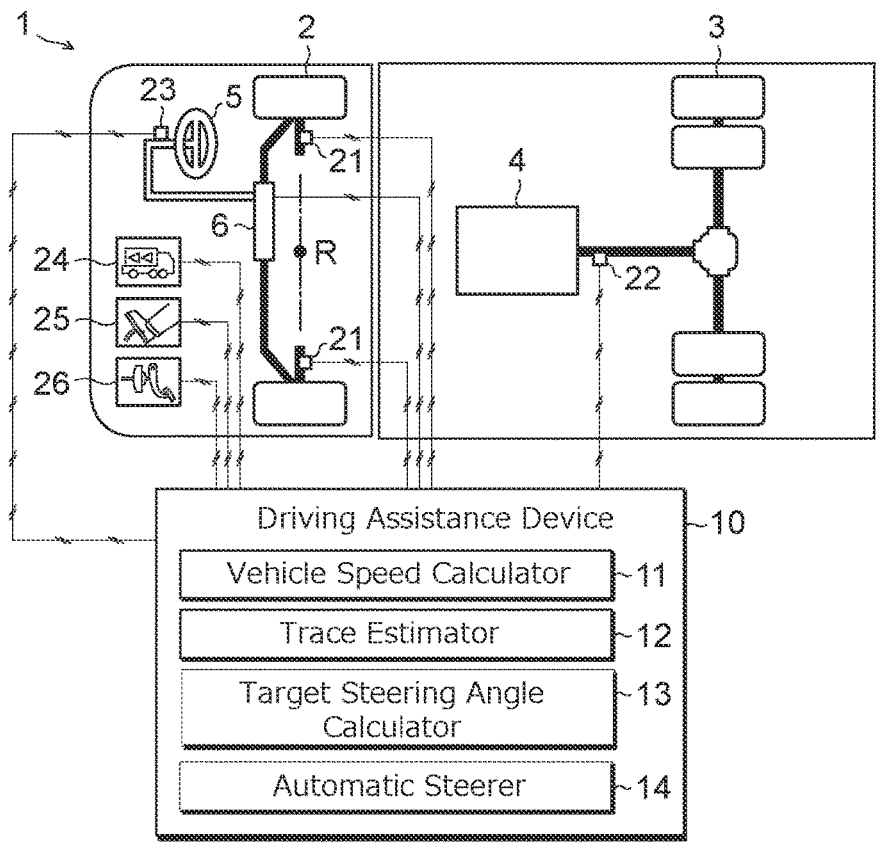
FIG. 1 A block diagram illustrating a configuration of a vehicle to which a driving assistance device according to the present application example is applied.

FIGS. 1 to 5 are diagrams for explaining a driving assistance device 10 according to the present application example and a modification. The driving assistance device 10 is an electronic controller (ECU, Electronic Control Unit) applied to a vehicle 1 depicted in FIG. 1. The driving assistance device 10 executes driving assistance control that performs automatic steering such that, when the vehicle 1 is reversing, the vehicle 1 tracks back along a trace formed in forward traveling. The vehicle 1 is, for example, a commercial vehicle such as a truck or a bus. Although the vehicle 1 depicted in FIG. 1 is a two-axle vehicle, the driving assistance device 10 can be applied to a three-axle vehicle or a four-axle vehicle. In the vehicle 1 of FIG. 1, a steerable wheel(s), i.e., a steering operation causes the direction of the wheel(s) to change, and the wheels for changing the traveling direction of the vehicle are front wheels 2, whereas drive wheels, i.e., the wheels to which driving power is transmitted for driving the vehicle are rear wheels 3.

To the front wheels 2, a steering device 6 (a steering device with a function of automatic steering) is attached. The steering device 6 includes therein a steering gear mechanism that changes an actual wheel angle(s) in accordance with a steering angle of a steering 5, and a drive device (for example, an electric motor, a hydraulic drive device, or the like) that automatically drives the steering gear mechanism without depending on a steering operation of a driver. To the rear wheels 3, a driving source 4 is connected via a propeller shaft. The type of the driving source 4 is not limited, and may be an electric motor, an engine, or a hybrid powertrain with these in combination.

The front wheels 2 are provided with wheel speed sensors 21 that detect rotating speeds of respective steerable wheels. The wheel speed sensors 21 output angular speed signals corresponding to wheel speeds of the steerable wheels. Further, the propeller shaft for transmitting driving force to the drive wheels 3 is provided with a drive shaft speed sensor 22 that detects a rotating speed of the drive wheels. The drive shaft speed sensor 22 outputs an angular speed signal corresponding to the rotating speed of the drive wheels. Information on the angular speed signals detected by these sensors 21 and 22 is transmitted to the driving assistance device 10.

The steering 5 is provided with a steering angle sensor 23 that detects the steering angle. Information on the steering angle detected here is transmitted to the driving assistance device 10. When the driving assistance control of the automatic steering is not being executed, the steering device 6 is controlled so that actual wheel angles of the front wheels 2 become angles corresponding to the steering angle. Further, when the driving assistance control of the automatic steering is being executed, the steering device 6 is automatically controlled even if the driver is not operating the steering 5.

Inside a cab in which the driver of the vehicle 1 rides, a driving assistance switch 24 operable by the driver is provided. The driving assistance switch 24 is a switch for instructing execution and/or stop of the driving assistance control of the automatic steering. When the driving assistance switch 24 is operated to an on-position, information on the operational position thereof is transmitted to the driving assistance device 10, and the driving assistance control of the automatic steering is executed. Further, when the driving assistance switch 24 is operated to an off-position, the driving assistance control of the automatic steering is stopped.

An accelerator pedal is provided with an accelerator position sensor 25 that outputs a signal corresponding to an accelerator position (depression amount of the accelerator pedal), and a brake pedal is provided with a brake pedal sensor 26 that outputs a signal corresponding to a depression amount of the brake pedal. Information detected by these sensors 25 and 26 is transmitted to the driving assistance device 10.

Figure 2:
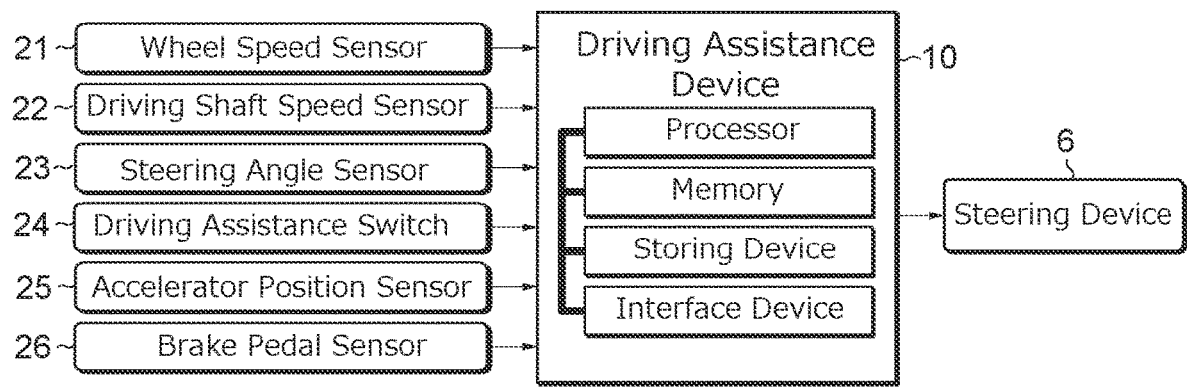
FIG. 2 A block diagram illustrating a configuration of the driving assistance device depicted in FIG. 1.

As illustrated in FIG. 2, on an input side of the driving assistance device 10, the wheel speed sensors 21, the drive shaft speed sensor 22, the steering angle sensor 23, the driving assistance switch 24, the accelerator position sensor 25, the brake pedal sensor 26, and the like are connected. Information detected by each of these is transmitted to the driving assistance device 10 via a communication path (for example, a hard wire or a CAN path). On an output side of the driving assistance device 10, the steering device 6 is connected. The driving assistance device 10 controls an operational state of the steering device 6 in accordance with the information inputted thereto.

The driving assistance device 10 includes at least a processor and a memory. The processor includes a microprocessor such as a CPU (Central Processing Unit), an MPU (Micro Processing Unit), or the like, and the memory includes, for example, a ROM (Read Only Memory), a RAM (Random Access Memory), or the like. Contents of the control to be executed by the driving assistance device 10 are recorded and stored in the memory as firmware or an application program.

When a program is executed, the contents of the program are expanded in a memory space and are read into the processor to be executed. In addition, as illustrated in FIG. 2, the driving assistance device 10 may be equipped with a storing device and/or an interface device. The storing device stores data and/or programs to be saved for a long period of time, and includes, for example, a flash memory, a non-volatile memory, or the like. The interface device is a device that controls input/output (Input/Output; I/O) between the driving assistance device 10 and an external device(s).

[2. Control Configuration]

As illustrated in FIG. 1, the driving assistance device 10 is provided with a vehicle speed calculator 11, a trace estimator 12, a target steering angle calculator 13, and an automatic steering unit 14. These elements represent expediently classified functions of the driving assistance device 10, and are recorded and stored in the form of, for example, a program or a subroutine in the memory within the driving assistance device 10. Each of the elements may be described as an independent program or subroutine, or may be described as a composite program that has multiple functions.

The vehicle speed calculator 11 calculates two types of traveling speeds. One is a traveling speed of the vehicle 1 calculated based on the rotating speeds of the steerable wheels detected by the wheel speed sensors 21, and is a speed used in the driving assistance control of the automatic steering. Hereinafter, this speed is referred to as a vehicle speed. The vehicle speed is obtained based on the average value of the rotating speeds of all steerable wheels (the left and right front wheels 2) (for example, by multiplying the average value by the circumferential length of the steerable wheels). It should be noted that, depending on the conditions, the vehicle speed may be obtained based on the rotating speed of the left or right front wheel, i.e., one of the steerable wheels.

The other speed is a traveling speed of the vehicle 1 calculated based on the signal detected by the drive shaft speed sensor 22, and is a speed used in an output control of the driving source 4. Hereinafter, this speed is referred to as a drive wheel speed. The drive wheel speed is obtained by, for example, multiplying the rotating speed of the rear wheels 3 by the circumferential length of the rear wheels 3. It should be noted that the vehicle speed of the present application example is a moving speed of the steerable wheels with respect to a road surface, and is differentiated from a general vehicle speed corresponding to a moving speed of the drive wheels. In this sense, the vehicle speed of the present application example can be referred to as a steerable wheel vehicle speed.

The trace estimator 12 estimates and records a trace H of the vehicle 1 based on the vehicle speed and the steering angle in forward traveling of the vehicle 1. That is, the trace estimator 12 uses the vehicle speed calculated based on the rotating speeds of the steerable wheels operated by the steering. Here, as illustrated in FIG. 3(A), the trace H in forward traveling of the vehicle 1 is estimated, and the data thereof is stored. The stored data corresponds to the trace H of, for example, the latest several tens to several hundreds of meters, and as the vehicle 1 travels forward, old data is overwritten with new data.

By regarding the central position of the front wheels 2 in a top view of the vehicle 1 as a reference point R, a path along which the reference point R has moved is estimated as the trace H. In the example depicted in FIG. 1, the center of the left and right wheels of the front wheels 2 (the center on a rotational axis when the actual wheel angles of the left and right wheels are in straight-ahead state) is the position of the reference point R. Based on the vehicle speed derived from the information obtained by the wheel speed sensors 21 and the steering angle detected by the steering angle sensor 23, the trace estimator 12 estimates the trace H by using a bicycle model. When the vehicle speed is obtained based on the rotating speed of the left or right front wheel, i.e., one of the steerable wheels, the position of the vehicle, that is, the position of the reference point may be regarded as the position of one of the steerable wheels used in the obtainment of the vehicle speed.

The bicycle model is a mathematical model for estimating a motion of a bicycle in which a wheel angle of a front wheel is variable and a wheel angle of a rear wheel is fixed. The bicycle model mathematically defines relationships between, for example, sizes and thicknesses of the front and rear wheels, wheelbases, friction coefficients of tires, wheel angles, speeds, traveling traces, and the likes. In estimating the trace H, the accuracy of the estimation may be enhanced by considering not only the vehicle speed and the steering angle, but also skids of tires, road surface gradients, and the likes.

The target steering angle calculator 13 calculates a target steering angle of the driving assistance control to be performed upon receipt of an instruction on the automatic steering. As illustrated in FIG. 3(B), the target steering angle is calculated based on a positional relationship between the reference point R corresponding to the current position of the vehicle 1 and the target point T. The current position of the vehicle 1 is estimated based on the vehicle speed in reversing of the vehicle 1 and an actual steering angle. The target point T is a point that is positioned on the trace H [the broken line in FIG. 3(B)] and that has a predetermined value D of distance from the reference point R.

The value of the predetermined value D may be a fixed value or a variable value. In the present application example, the predetermined value D is changed in accordance with the vehicle speed. For example, the predetermined value D is set to be larger as the vehicle speed is higher. Accordingly, for example, when the vehicle 1 is quickly moved backward, the target point T is set at a farther rear point. In contrast, the lower the vehicle speed is, the smaller the predetermined value D is set, which means that, when the vehicle 1 is slowly moved backward, the target point T is set at a closer point. This enhances the accuracy in following the trace H by the automatic steering.

The automatic steering unit 14 controls, in the driving assistance control, the steering device 6 so that the actual steering angle becomes the target steering angle calculated by the target steering angle calculator 13, and automatically steers the wheel angles of the steering 5 and the front wheels 2. According to this control, the current position of the vehicle 1 is appropriately controlled, and consequently, the vehicle 1 moves backward along the trace H. At this time, the moving speed (output of the driving source 4) of the vehicle 1 is controlled in accordance with the accelerator position, the brake pressure, the drive wheel speed, and the like. In order to make the actual steering angle become closer to the target steering angle, feedback control of the steering angle based on the current position of the vehicle 1 may be added.

[3. Flowchart]

Figure 4:
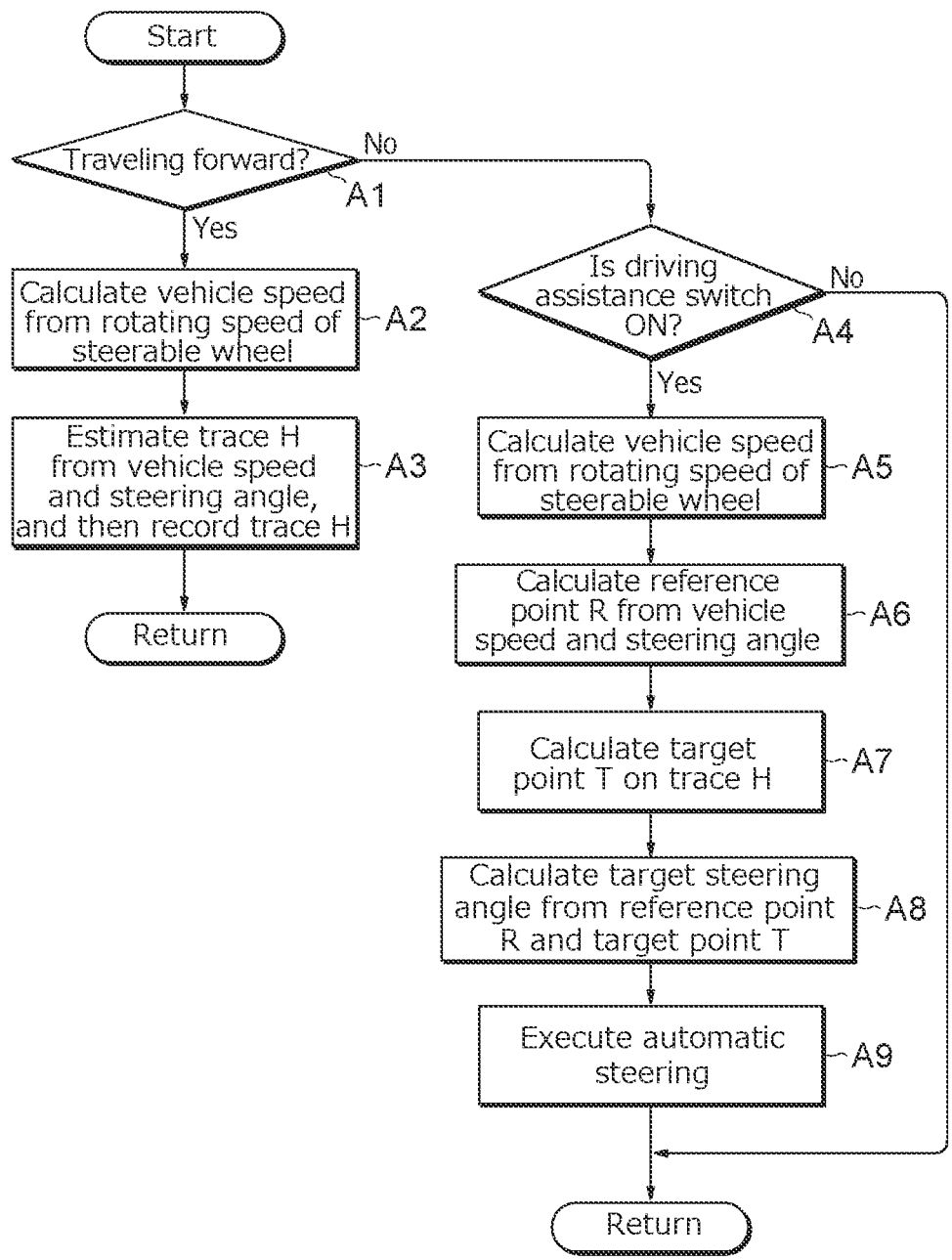
FIG. 4 A flowchart illustrating a procedure of control executed by the driving assistance device depicted in FIG. 1.

FIG. 4 is a flowchart for explaining a procedure of control performed by the driving assistance device 10. In Step A1, it is determined whether or not the vehicle 1 is traveling forward. If the vehicle 1 is traveling forward, the process proceeds to Step A2, and the vehicle speed calculator 11 calculates the vehicle speed based on the rotating speeds of the steerable wheels, which are detected by the wheel speed sensors 21. The vehicle speed is considered to correspond to the moving speed of the reference point R depicted in FIG. 1. In the subsequent Step A3, the trace estimator 12 estimates the trace H based on the vehicle speed and the actual steering angle, and also records the data. Regardless of the position of the driving assistance switch 24, as long as the vehicle 1 is traveling forward, such estimation and recording of the trace H are continued.

When the vehicle 1 is not traveling forward in Step A1 (for example, when the vehicle 1 is reversing), the process proceeds to Step A4, and it is determined whether or not the driving assistance switch 24 is operated to the on-position. When this condition is satisfied (when the driving assistance switch 24 is operated to the on-position), the process proceeds to Step A5. On the other hand, when this condition is not satisfied, the process skips Steps A5 to A9, and the control in this calculation cycle ends.

In Step A5, the vehicle speed calculator 11 calculates the vehicle speed based on the rotating speeds of the steerable wheels, which are detected by the wheel speed sensors 21. In the subsequent Step A6, the position of the reference point R is calculated based on the vehicle speed and the actual steering angle. Further, in Step A7, the position of the target point T is calculated, which is on the trace H and has the predetermined value D of distance from the reference point R. The magnitude of the predetermined value D is set to correspond to, for example, the vehicle speed.

In Step A8, the target steering angle calculator 13 calculates the target steering angle based on the positional relationship between the reference point R and the target point T. In Step A9, the automatic steering unit 14 controls the steering device 6 so that the actual steering angle becomes the target steering angle. As a result, the wheel angle of the steering 5 is automatically steered. If the vehicle 1 is reversing with the driving assistance switch 24 operated to the on-position, such driving assistance control of the automatic steering is continued.

[4. Actions and Effects]

(1) In the driving assistance device 10 described above, the vehicle speed calculator 11 calculates the vehicle speed based on the rotating speeds of the steerable wheels detected by the wheel speed sensors 21. Since the information on this vehicle speed is reflected in the trace H estimated by the trace estimator 12, the precise trace H is accurately specified. In addition, since the information on the vehicle speed is reflected also in the target steering angle calculated by the target steering angle calculator 13, the steering angle in reversing of the vehicle 1 is optimized.

Especially, since the wheelbase is long in a commercial vehicle such as a truck, by calculating the vehicle speed based on the steerable wheel operated by the steering that determines the steering angle, and by obtaining the trace based on this vehicle speed and the steering angle, a more accurate trace of the vehicle is specified. In addition, when the vehicle is reversing, based on this vehicle speed and the steering angle, the vehicle position, that is, the position of the reference point is accurately estimated. This results in more accurate calculation of the target steering angle for tracking along the trace, and thus, correct tracking along the trace is enabled. Accordingly, the vehicle 1 can be moved backward along the trace H with a simple configuration, and the accuracy of the automatic steering can be enhanced.

In addition, for example, even in the vehicle 1 that is not equipped with an on-board camera or GPS, the driving assistance control of the automatic steering can be appropriately realized. In other words, a large and expensive GPS sensor or module is unnecessary, so that the cost can be reduced and the device configuration can be simplified. Thus, the accuracy of the automatic steering can be enhanced with a simple configuration that uses only existing sensors.

(2) In the driving assistance device 10 described above, the target steering angle calculator 13 changes the predetermined value D in accordance with the vehicle speed calculated by the vehicle speed calculator 11 when the vehicle 1 is reversing. This enhances the accuracy in following the trace H by the automatic steering. Therefore, the accuracy of the automatic steering can be enhanced with a simple configuration, and the vehicle can reach the target point more accurately.

(3) In the driving assistance device 10 described above, the target steering angle calculator 13 changes the predetermined value D to be larger as the vehicle speed calculated by the vehicle speed calculator 11 is higher when the vehicle 1 is reversing, and changes the predetermined value D to be smaller as the vehicle speed is lower. As a result, when the vehicle 1 is quickly moved backward, the target point T is set at a farther point, and conversely, when the vehicle 1 is slowly moved backward, the target point T is set at a closer point, which yields enhanced accuracy in following the trace H by the automatic steering.

(4) In the driving assistance device 10 described above, the vehicle speed is calculated based on the average value of the rotating speeds of all the steerable wheels. For example, the average value of the rotating speed is calculated for each of the left and right front wheels 2, and this average value is multiplied by the circumferential length of the front wheels 2 to calculate the vehicle speed. Such a control configuration makes it possible to accurately obtain the moving speed of the reference point R and to enhance the accuracy in estimating the motion and/or the trace H of the vehicle 1. Therefore, the accuracy of the automatic steering can be enhanced with a simple configuration.

(5) In the driving assistance device 10 described above, in a top view of the vehicle 1, the central position of all the steerable wheels is regarded as the reference point R. By regarding the path along which the reference point R has moved as the trace H, the accuracy in estimating the actual motion and/or the trace H of the vehicle 1 can be enhanced. Therefore, the accuracy of the automatic steering can be enhanced with a simple configuration.

[5. Miscellaneous]

The application example (embodiment) described above is merely an example, and is not intended to exclude the application of various modifications and techniques not explicitly described in the application example described above. Each configuration of the application example described above can be variously modified and implemented without departing from the gist thereof. Also, part of multiple elements may be selected as necessary or may be combined with other known techniques.

The application example described above exemplifies the driving assistance control of the automatic steering of which the control target is the steering angle in reversing of the vehicle 1, but the control target may be other parameters that correspond to the steering angle. For example, the control target may be the actual wheel angles of the steerable wheels or an operation amount of the drive device incorporated in the steering device 6. Similarly, although the trace in forward traveling and the current position of the vehicle 1 are obtained based on the steering angle, an alternative scheme may obtain those by using the actual wheel angle corresponding to the steering angle. Even when these values corresponding to the steering angle are used as the control target, the same actions and effects as those of the application example described above can be obtained.

Figure 5:
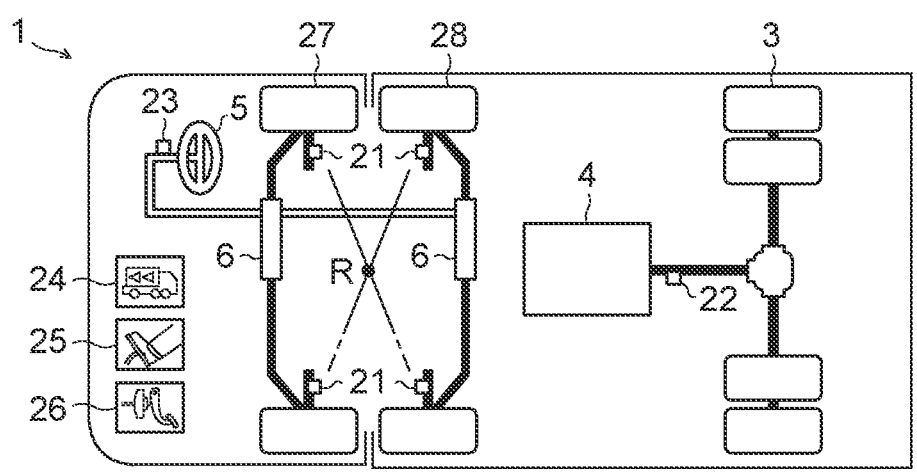
FIG. 5 A block diagram illustrating a configuration of a vehicle to which a driving assistance device according to a modification is applied.

Further, the application example described above exemplifies the vehicle 1 of a two-axle vehicle, but the driving assistance device 10 may be applied to a vehicle 1 of a three-axle or four-axle vehicle. FIG. 5 is a schematic diagram illustrating the vehicle 1 of a front two-axle vehicle. The steerable wheels of this vehicle 1 are four wheels consisting of left and right head front wheels 27, and left and right hind front wheels 28. In this case, the reference point R of the vehicle 1 is regarded as the central position of the four steerable wheels in a top view. Further, the vehicle speed is calculated based on the average value of the rotating speeds of the four steerable wheels. In such a front two-axle vehicle, by estimating the path along which the reference point R has moved as the trace H, the vehicle 1 can accurately move backward along the trace H, and the accuracy of the automatic steering can be enhanced. Therefore, the same actions and effects as those of the application example described above can be obtained.

REFERENCE SIGNS LIST 1 vehicle
2 front wheel (steerable wheel, non-drive wheel)
3 rear wheel (drive wheel)
4 driving source
5 steering
6 steering device
10 driving assistance device
11 vehicle speed calculator
12 trace estimator
13 target steering angle calculator
14 automatic steering unit
21 wheel speed sensor
22 driving shaft speed sensor
23 steering angle sensor
24 driving assistance switch
25 accelerator position sensor
26 brake pedal sensor
27 head front wheel
28 hind front wheel
H trace
R reference point
T target point
D predetermined value

The invention claimed is:

1. A driving assistance device that executes automatic steering such that, when a vehicle is reversing, the vehicle tracks back along a trace formed in forward traveling, the driving assistance device comprising:
   a trace estimator that estimates the trace based on a vehicle speed and a steering angle in forward traveling of the vehicle;
   a target steering angle calculator that calculates, upon receipt of an instruction on the automatic steering, a target steering angle based on a positional relationship between a reference point and a target point, the reference point corresponding to a current position of the vehicle estimated from the vehicle speed and the steering angle, the target point being positioned on the trace and having a predetermined value of distance from the reference point; and
   an automatic steering unit that automatically operates a steering such that a steering angle in reversing of the vehicle becomes the target steering angle,
   the driving assistance device further comprising
   a vehicle speed calculator that calculates the vehicle speed based on a rotating speed of a steerable wheel.

2. The driving assistance device according to claim 1, wherein
   the target steering angle calculator changes the predetermined value in accordance with the vehicle speed calculated by the vehicle speed calculator when the vehicle is reversing.

3. The driving assistance device according to claim 2, wherein
   the target steering angle calculator changes the predetermined value to be larger as the vehicle speed calculated by the vehicle speed calculator is higher when the vehicle is reversing, and changes the predetermined value to be smaller as the vehicle speed is lower.

4. The driving assistance device according to claim 1, wherein
   the vehicle speed is calculated based on an average value of rotating speeds of all steerable wheels.

5. The driving assistance device according to claim 1, wherein
   the reference point is regarded as a central position of all steerable wheels in a top view of the vehicle, and
   the trace is estimated as a path along which the reference point has moved.

* * * * *